(12) United States Patent
Meyer et al.

(10) Patent No.: US 12,473,397 B2
(45) Date of Patent: *Nov. 18, 2025

(54) POLYESTER CARBONATES FROM ALIPHATIC DIACIDS AND ALIPHATIC DIOLS, AND PROCESS FOR THE PRODUCTION THEREOF

(71) Applicant: COVESTRO INTELLECTUAL PROPERTY GMBH & CO. KG, Leverkusen (DE)

(72) Inventors: Alexander Meyer, Düsseldorf (DE); Jan Heijl, Lokeren (BE); Helmut Werner Heuer, Siegen (DE); Annabelle Bertin, Antwerp (BE)

(73) Assignee: Covestro Intellectual Property GmbH & Co. KG, Leverkusen (DE)

( * ) Notice: Subject to any disclaimer, the term of this patent is extended or adjusted under 35 U.S.C. 154(b) by 514 days.

This patent is subject to a terminal disclaimer.

(21) Appl. No.: 17/783,805

(22) PCT Filed: Dec. 15, 2020

(86) PCT No.: PCT/EP2020/086099
§ 371 (c)(1),
(2) Date: Jun. 9, 2022

(87) PCT Pub. No.: WO2021/122514
PCT Pub. Date: Jun. 24, 2021

(65) Prior Publication Data
US 2023/0026717 A1  Jan. 26, 2023

(30) Foreign Application Priority Data
Dec. 16, 2019 (EP) .................................. 19216480

(51) Int. Cl.
C08G 63/64 (2006.01)
C08G 63/199 (2006.01)
C08G 63/83 (2006.01)
C08G 64/04 (2006.01)
C08G 64/30 (2006.01)

(52) U.S. Cl.
CPC ........... *C08G 63/64* (2013.01); *C08G 63/199* (2013.01); *C08G 63/83* (2013.01); *C08G 64/04* (2013.01); *C08G 64/307* (2013.01)

(58) Field of Classification Search
None
See application file for complete search history.

(56) References Cited

U.S. PATENT DOCUMENTS

| | | |
|---|---|---|
| 3,972,852 A | 8/1976 | Inata et al. |
| 10,479,860 B2 | 11/2019 | Oh et al. |
| 2009/0105393 A1 | 4/2009 | Jansen et al. |
| 2020/0362105 A1 * | 11/2020 | Oh ......................... C08G 63/64 |
| 2022/0073737 A1 | 3/2022 | Meyer et al. |

FOREIGN PATENT DOCUMENTS

| | | | |
|---|---|---|---|
| CN | 101889041 A | 11/2010 | |
| CN | 113166384 A | 7/2021 | |
| DE | 2438053 A1 | 2/1975 | |
| EP | 3026074 A1 * | 6/2016 | ............. C08G 63/64 |
| EP | 3248999 A1 | 11/2017 | |
| JP | 06-167489 A | 6/1994 | |
| JP | H1087799 A | 4/1998 | |
| JP | 2003514042 A | 4/2003 | |
| JP | 2014214251 A | 11/2014 | |
| JP | 2016525610 A | 8/2016 | |
| JP | 2018504497 A | 2/2018 | |
| WO | WO-0132742 A1 * | 5/2001 | ............. C08G 63/64 |
| WO | WO-2019147051 A1 * | 8/2019 | ............. C08G 63/64 |

OTHER PUBLICATIONS

Kreye et al., Base catalyzed sustainable synthesis of phenyl esters from carboxylic acids using diphenyl carbonate, 2015, RSC Advances, 5, 53155-53160 (Year: 2015).*

IIT Delhi, TCI Chemicals India Pvt Ltd, Price List 2017-18 (Year: 2018).*

International Search Report and Written Opinion received for PCT Patent Application No. PCT/EP20/086099, mailed on Feb. 10, 2021, 11 pages (2 pages of English Translation and 9 pages of Original Document).

Okada et al., "Biodegradable polymers based on renewable resources. VI. Synthesis and biodegradability of poly(ester carbonate )s containing 1.4:3.6-dianhydro-D-glucitol and sebacic acid units" Journal Of Applied Polymer Science, vol. 86. No. 4. 2002, pp. 872-880.

* cited by examiner

*Primary Examiner* — Randy P Gulakowski
*Assistant Examiner* — Audra J Destefano
(74) *Attorney, Agent, or Firm* — The Webb Law Firm

(57) ABSTRACT

The present invention relates to a process for preparing a polyester carbonate on the basis of aliphatic diacids and aliphatic diols and to the polyester carbonate prepared according to the process and to a moulding mass and moulding body containing the polyester carbonate. The process according to the invention is a direct synthesis in which all structural elements forming the subsequent polyester carbonate are already present as monomers in the first process step and in which two catalysts are used.

12 Claims, No Drawings

POLYESTER CARBONATES FROM ALIPHATIC DIACIDS AND ALIPHATIC DIOLS, AND PROCESS FOR THE PRODUCTION THEREOF

CROSS-REFERENCE TO RELATED APPLICATIONS

This application is a national stage application (under 35 U.S.C. § 371) of PCT/EP2020/086099, filed Dec. 15, 2020, which claims benefit of European Application No. 19216480.4, filed Dec. 16, 2019, both of which are incorporated herein by reference in their entirety.

The present invention relates to a process for producing a polyester carbonate starting from aliphatic, preferably cycloaliphatic, diacids and aliphatic diols, to the polyester carbonate itself produced by the process, to a molding compound comprising the polyester carbonate, and to moldings comprising the polyester carbonate.

Polyesters, polycarbonates, and polyester carbonates are known to have good mechanical properties and good stability to heat distortion and to weathering. Depending on the monomers used, each polymer group has certain key features that characterize materials of this type. For instance, polycarbonates have in particular good mechanical properties, whereas polyesters often exhibit better chemical stability. Polyester carbonates, depending on the monomers selected, exhibit property profiles from both of said groups.

Although aromatic polycarbonates or polyesters often do have a good property profile, they exhibit shortcomings in their stability to aging and to weathering. For example, absorption of UV light leads to yellowing and sometimes embrittlement of these thermoplastic materials. Aliphatic polycarbonates and polyester carbonates have better properties in this respect, in particular better stability to aging and/or to weathering and better optical properties (for example transmission).

The drawback with aliphatic polycarbonates or polyester carbonates is often the low glass transition temperature thereof. It is accordingly advantageous to use cycloaliphatic alcohols as (co)monomers. Examples of such cycloaliphatic alcohols are TCD alcohol (tricyclodecanedimethanol), cyclohexanediol, cyclohexanedimethanol, and biobased diols based on 1,4:3,6-dianhydrohexitols such as isosorbide and the isomers isomannide and isoidide. To raise the glass transition temperature further, cycloaliphatic acids such as cyclohexane-1,2-, -1,3- or -1,4-dicarboxylic acids or corresponding naphthalene derivatives can also be used as (co)monomers. Depending on the choice of reactants, polyesters or polyester carbonates are then obtained. This application relates to the direct conversion of the raw materials, i.e. isosorbide and aliphatic, preferably cycloaliphatic, diacids by way of example, into the corresponding polyester carbonates. The polyesters of cyclohexanedicarboxylic acid and isosorbide are described by Oh et al. in Macromolecules 2013, 46, 2930-2940, whereas the present invention is by preference directed to polyester carbonates.

Polyester carbonates are produced on an industrial scale for example by transesterification of corresponding ester-containing monomers with diols. For instance, the polyester of cyclohexane-1,4-dimethanol and cyclohexane-1,4-dicarboxylic acid is produced starting from the dimethyl ester of the diacid (blend of this polyester and polycarbonate: Xyrex® from DuPont).

For the transesterification reaction, phenyl esters are however significantly more reactive than their aliphatic analogs. EP 3026074 A1 and EP 3248999 A1 describe processes for producing polyester carbonates having phenyl esters as an intermediate step.

Example 1 of EP 3026074 A1 describes the direct reaction of the diacid with phenol to form the corresponding ester. In example 2 of EP 3026074 A1, a dimethyl ester is reacted with phenol. The yield for both phenyl ester production variants is however capable of being improved further. This is then followed by production of the polyester carbonate.

EP 3248999 A1 describes the production of a diphenyl ester in a solvent and with the use of phosgene. Given that the subsequent reaction to form the aliphatic polyester carbonate does not involve the use of phosgene, the combination of a phosgene process with a transesterification process in the same part of a plant is very disadvantageous. The process described in EP 3248999 A1 is accordingly suboptimal too.

In Kricheldorf et al. (Macromol. Chem. Phys 2010, 211, 1206-1214) it is reported that a polyester based on cyclohexanedicarboxylic acid and isosorbide is not obtainable from cyclohexanedioic acid or from the cyclohexane dimethyl ester (or gives only very low molecular weights) and can be produced only from the acid chloride of cyclohexanedicarboxylic acid.

The easy preparation of aromatic polyester carbonates is described for example in WO 01/32742 A1. This describes a direct synthesis or one-pot synthesis, i.e. a synthesis in which all the structural elements that form the subsequent polyester carbonate are already present as monomers at the start of the synthesis. Aromatic dihydroxy compounds such as bisphenol A, carboxylic diesters and aromatic or linear aliphatic diacids are used as monomers here. Because this document is limited to the preparation of aromatic polyester carbonates, it is possible for temperatures of 300° C. to be employed in the condensation reaction in which the phenol that is formed is removed. The use of such temperatures is not possible when preparing aliphatic polyester carbonates, since aliphatic diols tend to undergo elimination and/or thermal decomposition when subjected to such thermal stress. At the same time, the high temperature is however necessary in order to grow to the desired high molecular weights. What is particularly clear here is the differing reactivity of aliphatic and aromatic diols. For example, it is known from the literature that isosorbide rarely undergoes complete incorporation into a polymer, with up to 25% of the isosorbide instead being lost during the polymerization reaction, depending on the chosen reaction conditions. It is accordingly not readily possible to extrapolate the reaction conditions for aromatic diols to aliphatic diols. This is in particular evident from the fact that the reaction times of the polycondensation (corresponding to process step (ii)) in WO01/32742 A1 are appreciably longer at higher temperatures than those observed in accordance with the invention. This document also describes the use of very small amounts of alkali metal ions as catalyst in the examples and a very wide range of amounts in the general part. In addition, a quaternary nitrogen base is used as a further catalyst. These are generally salts of low volatility that normally remain in the reaction system. The diesters obtained are then additionally reacted with aromatic alcohols (such as phenol) to form a polyester carbonate. Phenols have significantly higher acidity than aliphatic alcohols.

JP1992-345616 A and DE2438053 A1 likewise use aromatic structural units and correspondingly high temperatures. For the reasons mentioned above, extrapolation of the teachings therein to aliphatic structural units is not possible.

Starting from this prior art, the object of the present invention was therefore to provide a process for producing a polyester carbonate from aliphatic, preferably cycloaliphatic, diacids and aliphatic diols by melt transesterification that is particularly straightforward and at the same time provides a polyester carbonate having a suitable molecular weight. In this context, "straightforward" is to be understood in particular as meaning a process that requires only modest outlay on equipment, involves few steps, in particular purification steps, and/or is accordingly economically and also environmentally advantageous.

A suitable molar mass is understood as meaning a polymer having a relative solution viscosity of 1.17 to 1.35, preferably 1.18 to 1.32, and particularly preferably 1.20 to 1.31, in each case measured in dichloromethane at a concentration of 5 g/l at 25° C. using an Ubbelohde viscometer. Those skilled in the art are familiar with the determination of relative solution viscosity using an Ubbelohde viscometer. This is in accordance with the invention preferably carried out as per DIN 51562-3; 1985-05. In this determination, the transit times of the polyester carbonate under investigation are measured by the Ubbelohde viscometer in order to then determine the difference in viscosity between the polymer solution and its solvent. For this, the Ubbelohde viscometer undergoes an initial calibration through measurement of the pure solvents dichloromethane, trichloroethylene, and tetrachlorethylene (always performing at least 3 measurements, but not more than 9 measurements). This is followed by the calibration proper with the solvent dichloromethane. The polymer sample is then weighed out, dissolved in dichloromethane and the flow time for this solution then determined in triplicate. The average of the flow times is corrected via the Hagenbach correction and the relative solution viscosity calculated.

If the solution viscosity is above the range stated above, thermoplastic processability is possible only with difficulty. A solution viscosity that is too low results in inadequate mechanical and thermal properties.

At least one, preferably all, of the abovementioned objects have been achieved by the present invention. It was surprisingly found that the synthesis of a polyester carbonate from aliphatic, preferably cycloaliphatic, diacids and aliphatic diols by melt transesterification is possible in a direct synthesis or one-pot synthesis in which all the structural elements that form the subsequent polyester carbonate are already present as monomers at the start of the synthesis.

However, it emerged that this requires the use of a mixture of two specially selected catalysts, it also being necessary for the proportion of alkali metal cations in the reaction mixture to be within a certain range. Firstly, it was surprising that a direct synthesis, despite the described preconceptions of the prior art, also works for the reaction of an aliphatic, preferably cycloaliphatic, dicarboxylic acid, an aliphatic dihydroxy compound (also termed aliphatic diol in accordance with the invention), and a diaryl carbonate. It was possible here to use varying molar ratios of the aliphatic, preferably cycloaliphatic, diacids and aliphatic diols and still achieve a polymer having a suitable molar mass. Specific molar ratios of the aliphatic, preferably cycloaliphatic, diacids and aliphatic diols are however particularly advantageous.

An additional surprise was that it is not the total amount of catalysts in the catalyst mixture that is key for the success of the polymerization reaction, but rather the proportion of alkali metal cations. This led to the discovery of a process that provides access to a polyester carbonate from aliphatic, preferably cycloaliphatic, diacids and aliphatic diols and is particularly straightforward, i.e. it requires only modest outlay on equipment, involves few steps, in particular purification steps, and is accordingly economically and also environmentally advantageous. It has moreover been found to be advantageous when the tertiary nitrogen base according to the invention, in particular DMAP, can be removed from the system by applying a negative pressure. This allows the catalyst to be effectively and easily removed from the system.

The process for producing a polyester carbonate of the invention can be described schematically, for example by the reaction of cyclohexanedicarboxylic acid, isosorbide, and diphenyl carbonate, as shown below:

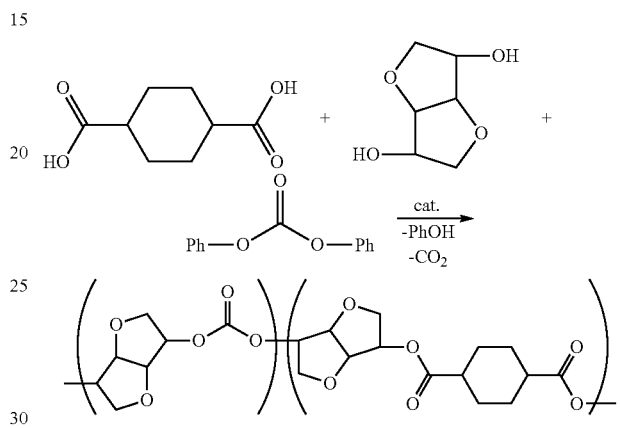

(the citing of these particular three starting substances is purely for the purposes of elucidating the invention and is not to be understood as limiting).

In the direct synthesis according to the invention, an evolution of gas was initially observed due to escaping carbon dioxide. If a sample is taken from the mixture once the evolution of gas has largely subsided, it can be demonstrated analytically that oligomers have already formed. These oligomers undergo condensation in a further step to form the polyester carbonate of the invention. Moreover, it was observed that the polyester carbonate of the invention shows more terminal phenyl groups in the $^{1}$H NMR than the polyester carbonate described in EP3026074 A1 that was produced via a two-step process. Even though a slight excess of isosorbide was used in the examples according to the invention, terminal phenyl groups still formed. These are advantageous, since terminal OH groups are hydrolytically unstable, particularly at the high processing temperatures of the polymer, can lead to transesterification reactions, and can also lower thermal stability.

The invention therefore provides a process for producing a polyester carbonate by melt transesterification, comprising the steps of:
(i) reacting at least one linear aliphatic dicarboxylic acid and/or at least one cycloaliphatic dicarboxylic acid with at least one diaryl carbonate in the presence of at least one aliphatic dihydroxy compound and in the presence of a first catalyst and/or a second catalyst and
(ii) subjecting the mixture obtained from process step (i) to a further condensation in the presence of the first and the second catalyst, at least with removal of the chemical compound eliminated in the condensation,
  wherein the first catalyst is at least one tertiary nitrogen base,
  wherein the second catalyst is at least one basic alkali metal salt, and wherein the proportion of alkali metal cations in process step (ii) is 0.0008% to 0.0030% by weight based on all components used in process step (i).

The invention also provides a process for producing a polyester carbonate by melt transesterification, comprising the steps of:
(i) reacting at least one cycloaliphatic dicarboxylic acid with at least one diaryl carbonate in the presence of at least one aliphatic dihydroxy compound and in the presence of a first catalyst and/or a second catalyst and
(ii) subjecting the mixture obtained from process step (i) to a further condensation in the presence of the first and the second catalyst, at least with removal of the chemical compound eliminated in the condensation,
    wherein the first catalyst is at least one tertiary nitrogen base,
    wherein the second catalyst is at least one basic alkali metal salt,
and wherein the proportion of alkali metal cations in process step (ii) is 0.0008% to 0.0030% by weight based on all components used in process step (i).

The proportion of alkali metal cations in process step (ii) of the invention is preferably from 0.0009% to 0.0025% by weight and more preferably from 0.0010% to 0.0020% by weight, in each case based on all components used in process step (i).

In a preferred embodiment, the first catalyst and the second catalyst are present in process step (i).

It is also possible to use a portion of the first catalyst and/or a portion of the second catalyst in process step (i) and then use the remainder in process step (ii).

It is however preferable for the total amount of the first and/or of the second catalyst to be used in process step (i). Most preferably, the total amount of both catalysts is used in process step (i).

According to the invention, process step (i) comprises at least the reaction of at least one linear aliphatic dicarboxylic acid and/or at least one cycloaliphatic dicarboxylic acid with at least one diaryl carbonate. However, the presence of the at least one aliphatic dihydroxy compound means that further reaction cannot according to the invention be ruled out. It is however according to the invention preferable for process step (i) to proceed until the evolution of gas is observed to have largely ceased, with process step (ii) initiated, for example by applying a negative pressure to remove the chemical compound eliminated in the condensation, only once this point is reached. However, as already described above, it may not necessarily be possible in accordance with the invention to achieve a clear separation between steps (i) and (ii) of the process.

Process Step (i)

The process of the invention is referred to as a direct synthesis or one-pot synthesis, since in process step (i) all the structural elements that form the subsequent polyester carbonate are already present as monomers. This preferably means that, in accordance with the invention, all aliphatic dihydroxy compounds, all linear aliphatic and/or cycloaliphatic dicarboxylic acids, and also all diaryl carbonates are present in this step, even when there is more than just one dihydroxy compound, one linear aliphatic and/or cycloaliphatic dicarboxylic acid and/or one diaryl carbonate. It is therefore according to the invention preferable that all monomers that are to undergo condensation to the polyester carbonate in process step (ii) are already present during process step (i). The invention likewise encompasses the embodiment in which a small proportion of the at least one diaryl carbonate is additionally added in process step (ii).

This may be selectively employed to lower the terminal OH group content of the polyester carbonate that is formed. Such an approach is described for example in JP2010077398 A. However, in order that all the structural elements that form the subsequent polyester carbonate are already present as monomers in process step (i) and no further structural elements are added, it is necessary here that the at least one diaryl carbonate added in small amounts in process step (ii) is the same as the at least one diaryl carbonate present in process step (i). The process can in this sense therefore still be referred to as a direct synthesis or one-pot synthesis.

In addition, the invention does not exclude the presence in process step (i) of aromatic dihydroxy compounds and/or aromatic dicarboxylic acids. However, these are preferably present only in small proportions. In process step (i) it is particularly preferable that an aromatic dihydroxy compound is additionally present in a content of up to 20 mol %, more preferably up to 10 mol %, and very particularly preferably up to 5 mol %, in each case based on the total molar amount of the dihydroxy compound used. In process step (i) it is likewise particularly preferable that an aromatic dicarboxylic acid is additionally present, optionally also in addition to the aromatic dihydroxy compound, in a content of up to 20 mol %, more preferably up to 10 mol %, and very particularly preferably up to 5 mol %, in each case based on the total molar amount of the dicarboxylic acid used. In these cases, it remains preferable in accordance with the invention to refer to the product as an aliphatic polyester carbonate. However, it is particularly preferable for no aromatic dihydroxy compound to be used in process step (i). It is also preferable for no aromatic dicarboxylic acid to be used in process step (i). Preference is likewise given to using neither an aromatic dihydroxy compound nor an aromatic dicarboxylic acid in process step (i).

These additional aromatic dihydroxy compounds are preferably selected from the group consisting of bisphenol A, 1,1-bis(4-hydroxyphenyl)-3,3,5-trimethylcyclohexane, 4,4'-dihydroxybiphenyl (DOD), 4,4'-dihydroxydiphenyl ether (DOD ether), bisphenol B, bisphenol M, and bisphenols (I) to (III)

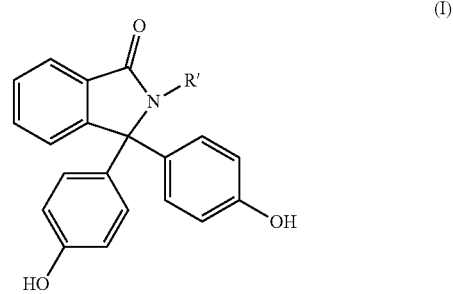

(I)

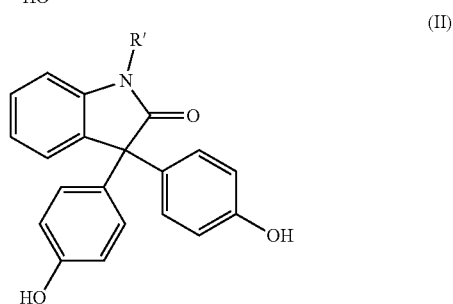

(II)

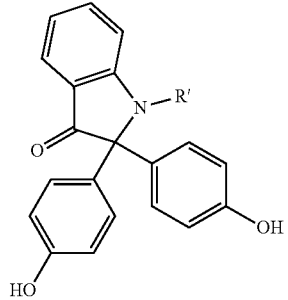

(III)

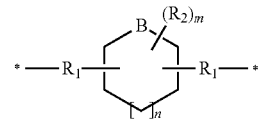

(Ia)

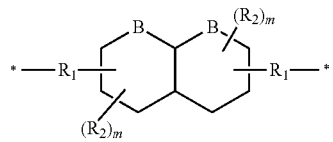

(Ib)

wherein, in these formulas (I) to (III), R' in each case represents C1-C4 alkyl, aralkyl or aryl, preferably methyl or phenyl, very particularly preferably methyl.

These additional aromatic dicarboxylic acids are preferably selected from the group consisting of isophthalic acid, terephthalic acid, furandicarboxylic acid and naphthalene-2,6-dicarboxylic acid. It is known that small proportions of these aromatic diacids can reduce the absorption of water by an aliphatic polyester carbonate.

According to the invention, at least one aliphatic dihydroxy compound is used in process step (i). This at least one aliphatic dihydroxy compound is preferably selected from the group consisting of cyclohexane-1,2-diol, cyclohexane-1,3-diol, cyclohexane-1,4-diol, cyclohexane-1,2-dimethanol, cyclohexane-1,3-dimethanol, cyclohexane-1,4-dimethanol, tricyclodecanedimethanol, 3,9-bis(1,1-dimethyl-2-hydroxyethyl)-2,4,8,10-tetraoxaspiro[5.5]undecane, 2,2-bis(4-hydroxycyclohexyl)propane, tetrahydrofuran-2,5-dimethanol, and 1,4:3,6-dianhydrohexitols such as isomannide, isoidide and isosorbide. Any desired mixtures may also be used. The at least one aliphatic dihydroxy compound is very particularly preferably isosorbide.

Likewise, in process step (i) at least one linear aliphatic dicarboxylic acid and/or at least one cycloaliphatic dicarboxylic acid is according to the invention used. It is preferable that at least one cycloaliphatic dicarboxylic acid is used. It is also preferable that at least one linear aliphatic dicarboxylic acid is used. It is also preferable that a mixture of a linear aliphatic dicarboxylic acid and a cycloaliphatic dicarboxylic acid is used.

It is particularly preferable that the at least one linear aliphatic dicarboxylic acid and/or the at least one cycloaliphatic dicarboxylic acid is represented by the general formula (1):

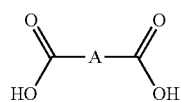

(1)

in which A represents R3 or one of formulas (Ia) or (Ib),
where $R_3$ represents a linear alkylene group having 3 to 16 carbon atoms, preferably 3 to 8 carbon atoms, more preferably 3 to 6 carbon atoms, further preferably 3 or 4 carbon atoms, and this alkylene group may optionally be mono- or polysubstituted or in which
B in each case independently represents a $CH_2$ group, O or S,
$R_1$ in each case independently represents a single bond or an alkylene group having 1 to 10 carbon atoms, preferably a single bond or an alkylene group having 1 to 9 carbon atoms, more preferably a single bond or an alkylene group having 1 to 8 carbon atoms, likewise preferably a single bond or an alkylene group having 1 to 5 carbon atoms, particularly preferably a single bond, and
$R_2$ in each case independently represents an alkyl group having 1 to 10 carbon atoms, preferably 1 to 9 carbon atoms, more preferably 1 to 8 carbon atoms,
n is a number between 0 and 3, preferably between 0 and 2, particularly preferably between 0 and 1, very particularly preferably 1,
m is a number between 0 and 6, preferably between 0 and 3, particularly preferably between 0 and 2, very particularly preferably 0, and "*" indicate the positions at which the carboxylic acid groups in formula (1) are present.

When $R_1$ represents a single bond, it will be appreciated that $R_1$ accordingly contains zero carbon atoms.

The term "linear alkylene group" and "linear (aliphatic) dicarboxylic acid" is in accordance with the invention used to differentiate from a "cycloaliphatic alkylene group" and "cycloaliphatic dicarboxylic acid" respectively. The linear variant does not contain any ring system. It is however possible for $R_3$ by way of example, which represents a linear alkylene group, to be optionally substituted. As a consequence, the linear alkylene group may in the broadest sense also be described as "branched". Thus, the term "linear alkylene group" does according to the invention preferably also encompass "branched alkylene groups". However, they do not in any case contain ring systems.

When A represents $R_3$, it is preferable that $R_3$ represents a linear alkylene group having 3 to 16 carbon atoms, preferably 3 to 8 carbon atoms, more preferably 3 to 6 carbon atoms, further preferably 3 or 4 carbon atoms, and that this alkylene group may optionally be mono- or polysubstituted. This alkylene group may preferably be substituted with at least one alkyl group, which preferably has 1 to 5 carbon atoms. Particularly preferably, the linear alkylene group is unsubstituted or is substituted with at least one alkylene group having 1 to 5 carbon atoms, preferably 1 to 4 carbon atoms, more preferably 1 to 3 carbon atoms. If it is substituted, it will have at least one tertiary, but potentially also at least one quaternary, carbon atom. Particularly preferably, the linear alkylene group $R_3$ is unsubstituted or is substituted with one to three alkylene groups. When there is more than one substitution, this may be present on one carbon atom (giving rise to a quaternary carbon atom) or on more than one carbon atom (giving rise to two tertiary carbon atoms) of the linear alkylene group $R_3$. Additionally preferably, the linear alkylene group $R_3$ is unsubstituted or is substituted with one to three methyl groups. Very particularly preferably, $R_3$ is selected from —CH$_2$—CH$_2$—CH$_2$—, —CH$_2$—CH$_2$—CH$_2$—CH$_2$—, —CH$_2$—CH$_2$—CH$_2$—CH$_2$—CH$_2$—, —CH$_2$—CH$_2$—CH$_2$—CH$_2$—CH$_2$—CH$_2$—, —CH$_2$—CH$_2$—CH$_2$—CH$_2$—CH$_2$—CH$_2$—CH$_2$—, —CH$_2$—CH$_2$—CH$_2$—CH$_2$—CH$_2$—CH$_2$—CH$_2$—CH$_2$—, —CH$_2$—CH$_2$—CH$_2$—CH$_2$—CH$_2$—CH$_2$—CH$_2$—CH$_2$—CH$_2$—, —CH$_2$—C(CH$_3$)$_2$—CH$_2$—, —CH$_2$—CH(CH$_3$)—CH$_2$—C(CH$_3$)$_2$—, —CH$_2$—C(CH$_3$)$_2$—CH$_2$—CH(CH$_3$)—, and —CH(CH$_3$)—CH$_2$—CH$_2$—C(CH$_3$)$_2$—. Likewise preferably, $R_3$ is selected from —CH$_2$—CH$_2$—CH$_2$—CH$_2$—, —CH$_2$—C(CH$_3$)2-CH$_2$—, —CH$_2$—CH(CH$_3$)—CH$_2$—C(CH$_3$)$_2$—, —CH$_2$—C(CH$_3$)$_2$—CH$_2$—CH(CH$_3$)—, and —CH(CH$_3$)—CH$_2$—CH$_2$—C(CH$_3$)$_2$—. Very particularly preferably, $R_3$ represents —CH$_2$—C(CH$_3$)2-CH$_2$-(3,3-dimethylglutaric acid).

When A represents one of the formulas (Ia) or (Ib), it is preferable that

B in each case independently represents a CH$_2$ group, O or S, preferably a CH$_2$ group, $R_1$ in each case independently represents a single bond or a linear alkylene group having 1 to 10 carbon atoms, particularly preferably a single bond, and $R_2$ in each case independently represents a linear alkyl group having 1 to 10 carbon atoms, preferably 1 to 9 carbon atoms, more preferably 1 to 8 carbon atoms, n is a number between 0 and 3, preferably between 0 and 2, particularly preferably between 0 and 1, very particularly preferably 1, m is a number between 0 and 6, preferably between 0 and 3, particularly preferably between 0 and 2, very particularly preferably 0, and "*" indicate the positions at which the carboxylic acid groups in formula (1) are present, From the number for m it can already be seen that in formulas (Ia) and (Ib) it is possible for two $R_2$ to be present on one carbon atom each or else for one $R_1$—* and one $R_2$ to be present on one carbon atom each. It is also possible for always just one substituent $R_1$—* or $R_2$ to be present on one carbon atom.

In particular, it is preferable that the cycloaliphatic dicarboxylic acid is hydrogenated dimer fatty acid or a compound of formula (IIa) or (IIb) or mixtures thereof. Hydrogenated dimer fatty acids are known to those skilled in the art. In particular, it is known that this can be a mixture of different compounds. This mixture may also comprise cycloaliphatic and linear compounds. These are according to the invention encompassed by the use of at least one linear aliphatic dicarboxylic acid and at least one cycloaliphatic dicarboxylic acid.

Preference is thus given to using hydrogenated dimer fatty acid as the linear aliphatic and/or cycloaliphatic dicarboxylic acid of the invention.

The at least one cycloaliphatic dicarboxylic acid is preferably selected from a compound of the chemical formula (IIa), (IIb) or mixtures thereof

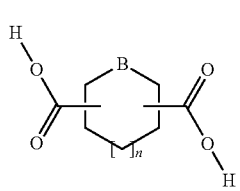
(IIa)

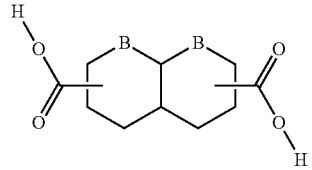
(IIb)

in which

B in each case independently represents a carbon atom or a heteroatom selected from the group consisting of O and S, preferably a CH$_2$ group or a heteroatom selected from the group consisting of O and S, and n is a number between 0 and 3. It is further preferable that B represents a carbon atom or O, preferably a CH$_2$ group or O, and n is a number between 0 and 3, preferably 0 or 1.

The at least one linear aliphatic dicarboxylic acid is particularly preferably selected from the group consisting of 2,2,4-trimethyladipic acid, 2,4,4-trimethyladipic acid, 2,2,5-trimethyladipic acid, and 3,3-dimethylglutaric acid. It is very particularly preferably 3,3-dimethylglutaric acid.

The at least one cycloaliphatic dicarboxylic acid is particularly preferably selected from the group consisting of cyclohexane-1,4-dicarboxylic acid, cyclohexane-1,3-dicarboxylic acid, cyclohexane-1,2-dicarboxylic acid, tetrahydrofuran-2,5-dicarboxylic acid, tetradihydrodimethylfuran-2,5-dicarboxylic acid, decahydronaphthalene-2,4-dicarboxylic acid, decahydronaphthalene-2,5-dicarboxylic acid, decahydronaphthalene-2,6-dicarboxylic acid, decahydronaphthalene-2,7-dicarboxylic acid, and hydrogenated dimer fatty acid. The at least one cycloaliphatic dicarboxylic acid is also preferably selected from the group consisting of cyclohexane-1,4-dicarboxylic acid, cyclohexane-1,3-dicarboxylic acid, cyclohexane-1,2-dicarboxylic acid, tetradihydrofuran-2,5-dicarboxylic acid, tetrahydrodimethylfuran-2,5-dicarboxylic acid, decahydronaphthalene-2,4-dicarboxylic acid, decahydronaphthalene-2,5-dicarboxylic acid, decahydronaphthalene-2,6-dicarboxylic acid, and decahydronaphthalene-2,7-dicarboxylic acid. Any desired mixtures may also be used. Very particularly preferably it is cyclohexane-1,4-dicarboxylic acid, cyclohexane-1,3-dicarboxylic acid or cyclohexane-1,2-dicarboxylic acid.

In particular, it is further preferable that a mixture of a linear aliphatic dicarboxylic acid and a cycloaliphatic dicarboxylic acid is used. It is particularly preferable that the at least one linear aliphatic dicarboxylic acid is selected from the group consisting of 2,2,4-trimethyladipic acid, 2,4,4-trimethyladipic acid, 2,2,5-trimethyladipic acid and 3,3-dimethylglutaric acid and that the at least one cycloaliphatic dicarboxylic acid is selected from the group consisting of cyclohexane-1,4-dicarboxylic acid, cyclohexane-1,3-dicarboxylic acid, cyclohexane-1,2-dicarboxylic acid, tetrahydrofuran-2,5-dicarboxylic acid, tetradihydrodimethylfuran-2,5-dicarboxylic acid, decahydronaphthalene-2,4-dicarboxylic acid, decahydronaphthalene-2,5-dicarboxylic acid, decahydronaphthalene-2,6-dicarboxylic acid, decahydronaphthalene-2,7-dicarboxylic acid, and hydrogenated dimer fatty acid. Particular preference is given to a mixture of 3,3-dimethylglutaric acid and 1,4-cyclohexanedicarboxylic acid, cyclohexane-1,3-dicarboxylic acid or cyclohexane-1,2-dicarboxylic acid.

According to the invention, at least one diaryl carbonate is also used in process step (i). The at least one diaryl carbonate is preferably selected from the group consisting of a compound of formula (2)

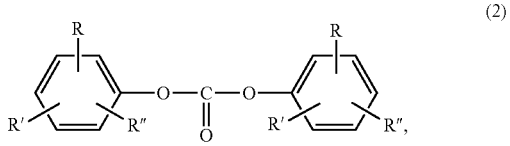

(2)

in which

R, R', and R" may each independently be identical or different and represent hydrogen, optionally branched C1-C34 alkyl, C7-C34 alkylaryl, C6-C34 aryl, a nitro group, a carbonyl-containing group, a carboxyl-containing group or a halogen group. The at least one diaryl carbonate is preferably diphenyl carbonate, 4-tert-butylphenyl phenyl carbonate, di(4-tert-butylphenyl) carbonate, biphenyl-4-yl phenyl carbonate, di(biphenyl-4-yl) carbonate, 4-(1-methyl-1-phenylethyl)phenyl phenyl carbonate, di[4-(1-methyl-1-phenylethyl)phenyl] carbonate, bis(methylsalicyl) carbonate, bis(ethylsalicyl) carbonate, bis(propylsalicyl) carbonate, bis(2-benzoylphenyl) carbonate, bis(phenylsalicyl) carbonate and/or bis(benzylsalicyl) carbonate. In particular, the at least one diaryl carbonate is preferably diphenyl carbonate, 4-tert-butylphenyl phenyl carbonate, di(4-tert-butylphenyl) carbonate, biphenyl-4-yl phenyl carbonate, di(biphenyl-4-yl) carbonate, 4-(1-methyl-1-phenylethyl)phenyl phenyl carbonate and/or di[4-(1-methyl-1-phenylethyl)phenyl] carbonate. The at least one diaryl carbonate is particularly preferably diphenyl carbonate.

In addition, a first catalyst and/or a second catalyst are according to the invention present in process step (i).

The first catalyst is a tertiary nitrogen base. This first catalyst is preferably selected from bases derived from guanidine, 4-dimethylaminopyridine (DMAP), 1,8-diazabicyclo[5.4.0]undec-7-ene, 1,5-diazabicyclo[4.3.0]non-5-ene, 1,5,7-triazabicyclo[4.4.0]dec-5-ene, hexamethylphosphorimide triamide, 1,2-dimethyl-1,4,5,6-tetrahydropyridine, 7-methyl-1,5,7-triazabicyclodec-5-ene, 1,8-diazabicyclo[5.4.0]undec-7-ene (DBU), DBN, ethylimidazole, N,N-diisopropylethylamine (Hünig's base), pyridine, TMG, and mixtures of these substances. Further preferably, the first catalyst is selected from bases derived from guanidine, 4-dimethylaminopyridine (DMAP), 1,8-diazabicyclo[5.4.0] undec-7-ene, 1,5-diazabicyclo[4.3.0]non-5-ene, and 1,5,7-triazabicyclo[4.4.0]dec-5-ene. Particular preference is given to using 4-dimethylaminopyridine.

The first catalyst is preferably used in an amount of from 0.002% to 0.10% by weight, more preferably in an amount of from 0.005% to 0.050% by weight, particularly preferably in an amount of from 0.008% to 0.030% by weight, in each case based on all components used in process step (i).

The alkali metal cations present in process step (ii) are preferably lithium cations, potassium cations, sodium cations, cesium cations, and mixtures thereof.

The second catalyst used is the organic or inorganic alkali metal or alkaline earth metal salt of a weak acid (pKa between 3 and 7 at 25° C.). Suitable weak acids are for example carboxylic acids, preferably C2-C22 carboxylic acids, such as acetic acid, propionic acid, oleic acid, stearic acid, lauric acid, benzoic acid, 4-methoxybenzoic acid, 3-methylbenzoic acid, 4-tert-butylbenzoic acid, p-tolueneacetic acid, 4-hydroxybenzoic acid, salicylic acid, partial esters of polycarboxylic acids, such as monoesters of succinic acid, branched aliphatic carboxylic acids, such as 2,2-dimethylpropanoic acid, 2,2-dimethylpropanoic acid, 2,2-dimethylbutanoic acid, and 2-ethylhexanoic acid.

Suitable organic and inorganic salts are or are derived from sodium hydrogen carbonate, potassium hydrogen carbonate, lithium hydrogen carbonate, sodium carbonate, lithium carbonate, potassium carbonate, sodium acetate, potassium acetate, lithium acetate, sodium stearate, potassium stearate, lithium stearate, sodium oleate, lithium oleate, potassium oleate, sodium benzoate, potassium benzoate, lithium benzoate, and the disodium, dipotassium, and dilithium salts of BPA. It is also possible to use calcium hydrogen carbonate, barium hydrogen carbonate, magnesium hydrogen carbonate, strontium hydrogen carbonate, calcium carbonate, barium carbonate, magnesium carbonate, strontium carbonate, calcium acetate, barium acetate, magnesium acetate, strontium acetate, calcium stearate, barium stearate, magnesium stearate and corresponding oleates. The use of corresponding salts of phenols, in particular of phenol, is additionally possible. These salts may be used individually or as a mixture.

The second catalyst is preferably selected from the group consisting of sodium hydroxide, lithium hydroxide, sodium phenoxide, lithium phenoxide, sodium benzoate, lithium benzoate, lithium chloride, lithium acetylacetonate, and cesium carbonate and mixtures of these substances. Particular preference is given to using sodium phenoxide, lithium phenoxide, sodium hydroxide, lithium hydroxide, sodium benzoate, lithium benzoate, lithium chloride and/or lithium acetylacetonate. Lithium chloride is preferably used as an aqueous solution, for example in the form of a 15% solution.

The second catalyst is also preferably selected from the group consisting of sodium hydroxide, sodium phenoxide, sodium benzoate, and cesium carbonate and mixtures of these substances. Particular preference is given to using sodium phenoxide, sodium hydroxide and/or sodium benzoate. Sodium benzoate is preferably used as an aqueous solution, for example in the form of a 15% solution.

It was found that the molar ratio of all aliphatic dihydroxy compounds present in process step (i) to all cycloaliphatic dicarboxylic acids present in process step (i) prior to the reaction in process step (i) is preferably 1:0.6 to 1:0.05, more preferably 1:0.5 to 1:0.15, and very particularly preferably 1:0.4 to 1:0.2

In order to achieve particularly favorable mechanical properties, good chemical resistance, and good processing properties, the ratio of aliphatic dihydroxy compounds and cycloaliphatic dicarboxylic acids in the subsequent polyester carbonate should preferably not be too high (i.e. content of incorporated cycloaliphatic dicarboxylic acids not too low).

In addition, process step (i) of the invention preferably comprises at least one, more preferably all of the following steps (ia) to (ic):

(ia) Melting of all components present in process step (i), i.e. at least the at least one linear aliphatic and/or at least one cycloaliphatic dicarboxylic acid, the at least one diaryl carbonate, and the at least one aliphatic dihydroxy compound, in the presence of the at least one catalyst. This is preferably done under an inert gas atmosphere, preferably under nitrogen and/or argon. Step (ia) is preferably carried out in the absence of a solvent. The term "solvent" is in this context known to those skilled in the art. The term "solvent" is according to the invention preferably understood as meaning a compound that does not undergo chemical reaction in either of process steps (i) and (ii). Exceptions are those compounds that are formed by the reaction (for example phenol when diphenyl carbonate is used as the at least one diaryl carbonate). It is of course not possible to rule out the presence of traces of solvents in the starting compounds. This eventuality is preferably to be covered by the invention.

However, it is according to the invention preferable that an active step of adding such a solvent is avoided.

(ib) Heating of the mixture, preferably the melt obtained from step (ia). Step (ia) and step (ib) may also overlap, since heating may likewise be necessary to produce a melt in step (ia). Heating is preferably initially to a temperature of 150° C. to 180° C.

(ic) Reacting the mixture, preferably the mixture obtained from step (ib), with introduction of mixing energy, preferably by stirring. Here too, step (ic) may overlap with step (ib), since the heating may already initiate the reaction of the mixture. The melt is here preferably already heated under standard pressure to temperatures between 150 and 180° C. by step (ib). Depending on the selected catalyst, the temperature can remain within a range of 160-200° C. Alternatively, the temperature in step (ic) is increased to 200° C.-300° C., preferably 210-260° C., more preferably 215-240° C., in stages, depending on the observed reactivity. The reactivity can be estimated from the evolution of gas, in a manner known to those skilled in the art. Although higher temperatures are in principle also possible in this step, side reactions (e.g. discoloration) can occur at higher temperatures. Higher temperatures are therefore less preferable. The mixture is stirred under standard pressure until the evolution of gas has largely ceased. It is in accordance with the invention possible that under these conditions the aryl alcohol formed from the reaction of the at least one carboxylic acid with the at least one diaryl carbonate (for example phenol when using diphenyl carbonate) will already be partly removed.

It was also observed in accordance with the invention that the at least one dihydroxy compound had likewise already begun to react by this time. This was demonstrated by the detection of oligomers containing carbonate units from the reaction of the at least one dihydroxy compound with the at least one diaryl carbonate and/or ester units from the reaction of the at least one dihydroxy compound with the at least one dicarboxylic acid.

It is in accordance with the invention therefore preferable that, prior to the performance of process step (ii), the mixture obtained from process step (i) includes oligomers containing carbonate units from the reaction of the at least one dihydroxy compound with the at least one diaryl carbonate and/or ester units from the reaction of the at least one dihydroxy compound.

The reaction time in step (ic) depends on the amount of the starting materials. Preferably, the reaction time in step (ic) is between 0.5 h to 24 h, preferably between 0.75 h and 5 h, and more preferably between 1 h and 3 h. A reaction time that ensures that gas evolution has largely subsided should preferably be chosen (see reaction scheme above).

It is according to the invention preferable that the molar ratio of the sum of all aliphatic dihydroxy compounds present in process step (i) and all linear aliphatic and/or cycloaliphatic dicarboxylic acids present in process step (i) to all diaryl carbonates present in process step (i) prior to reaction in process step (i) is 1:0.4 to 1:1.6, preferably 1:0.5 to 1:1.5, further preferably 1:0.6 to 1:1.4, more preferably 1:0.7 to 1:1.3, particularly preferably 1:0.8 to 1:1.2, and very particularly preferably 1:0.9 to 1:1.1.

Those skilled in the art are capable of selecting appropriate optimal ratios in line with the purity of the starting materials.

Process Step (ii)

In process step (ii), the mixture obtained from process step (i) undergoes further condensation, at least with removal of the chemical compound eliminated in the condensation. In the context of the invention, the expression "further" condensation is to be understood as meaning that at least some condensation has already taken place in process step (i). This is preferably the reaction of the at least one linear aliphatic and/or at least one cycloaliphatic dicarboxylic acid with the at least one diaryl carbonate accompanied by elimination of an aryl alcohol. It is however preferable that further condensation to oligomers has also already taken place (see process step (i)).

When only the first catalyst or only the second catalyst was used in process step (i), the catalyst not used in process step (i) is added in process step (ii).

The term "condensation" is known to those skilled in the art. This is preferably understood as meaning a reaction in which two molecules (of the same substance or different substances) combine to form a larger molecule, with a molecule of a chemically simple substance being eliminated. This compound eliminated in the condensation is removed in process step (ii). It is preferable that the chemical compound eliminated in the condensation is removed in process step (ii) by means of reduced pressure. It is accordingly preferable that the process of the invention is characterized in that volatiles having a boiling point below the cycloaliphatic diester formed in process step (i), below the at least one aliphatic dihydroxy compound, and below the at least one diaryl carbonate are removed during the reaction in process step (i), optionally with a stepwise reduction in pressure. Removal in stages is the preferred option here when different volatiles are being removed. Opting for removal in stages is also preferred in order to ensure that volatiles are removed as completely as possible. The volatiles are the chemical compound(s) eliminated in the condensation.

Reducing the pressure in stages can be done for example by lowering the pressure as soon as the overhead temperature falls, so as to ensure continuous removal of the chemical compound eliminated in the condensation. Once a pressure of 1 mbar, preferably <1 mbar, is reached, the condensation is continued until the desired viscosity has been attained. This can be done for example by monitoring the torque, i.e. the polycondensation is stopped on attaining the desired stirrer torque.

The removal of the condensation product in process step (ii) preferably takes place at temperatures of 200° C. to 280° C., more preferably 210° C. to 260° C., and particularly preferably 220° C. to 250° C. The vacuum during the removal is further preferably 500 mbar to 0.01 mbar. It is particularly preferable for removal to be effected in stages by reducing the vacuum. Very particularly preferably, the vacuum in the final stage is 10 mbar to 0.01 mbar.

In a further aspect of the present invention, a polyester carbonate is provided that is obtained by the above-described process of the invention in all disclosed combinations and preferences. The polyester carbonate of the invention can be processed as such into moldings of all kinds. It can also be processed into thermoplastic molding compounds with other thermoplastics and/or polymer additives. The molding compounds and moldings are further provided by the present invention.

The polymer additives are preferably selected from the group consisting of flame retardants, anti-drip agents, flame retardant synergists, smoke inhibitors, lubricants and demolding agents, nucleating agents, antistats, conductivity additives, stabilizers (e.g. hydrolysis, heat aging and UV stabilizers and also transesterification inhibitors), flow promoters, phase compatibilizers, dyes and pigments, impact modifiers and also fillers and reinforcers.

The thermoplastic molding compounds may be produced for example by mixing the polyester carbonate and the other constituents and melt-compounding and melt-extruding the resulting mixture at temperatures of preferably 200° C. to 320° C. in customary apparatuses, for example internal kneaders, extruders, and twin-shaft screw systems, in a known manner. This process is in the context of the present application generally referred to as compounding.

The term "molding compound" is thus to be understood as meaning the product obtained when the constituents of the composition are melt-compounded and melt-extruded.

The moldings obtained from the polyester carbonate of the invention or from the thermoplastic molding compounds comprising the polyester carbonate can be produced for example by injection molding, extrusion, and blow-molding processes. A further form of processing is the production of moldings by thermoforming from previously produced sheets or films.

Embodiments 0 to 25 of the present invention are described hereinbelow.

0. A process for producing a polyester carbonate by melt transesterification, comprising the steps of:
   (i) reacting at least at least one linear aliphatic and/or cycloaliphatic dicarboxylic acid with at least one diaryl carbonate in the presence of at least one aliphatic dihydroxy compound and in the presence of a first catalyst and/or a second catalyst,
   (ii) subjecting the mixture obtained from process step (i) to a further condensation in the presence of the first catalyst and the second catalyst, at least with removal of the chemical compound eliminated in the condensation,
       wherein the first catalyst is at least one tertiary nitrogen base,
       wherein the second catalyst is at least one basic alkali metal salt,
       and wherein the proportion of alkali metal cations in process step (ii) is 0.0008% to 0.0030% by weight based on all components used in process step (i).

1. A process for producing a polyester carbonate by melt transesterification, comprising the steps of:
   (i) reacting at least at least one cycloaliphatic dicarboxylic acid with at least one diaryl carbonate in the presence of at least one aliphatic dihydroxy compound and in the presence of a first catalyst and/or a second catalyst,
   (ii) subjecting the mixture obtained from process step (i) to a further condensation in the presence of the first catalyst and the second catalyst, at least with removal of the chemical compound eliminated in the condensation,
       wherein the first catalyst is at least one tertiary nitrogen base,
       wherein the second catalyst is at least one basic alkali metal salt,
       and wherein the proportion of alkali metal cations in process step (ii) is 0.0008% to 0.0030% by weight based on all components used in process step (i).

2. The process according to embodiment 0 or 1, characterized in that the at least one aliphatic dihydroxy compound is selected from the group consisting of cyclohexane-1,2-diol, cyclohexane-1,3-diol, cyclohexane-1,4-diol, cyclohexane-1,2-dimethanol, cyclohexane-1,3-dimethanol, cyclohexane-1,4-dimethanol, tricyclodecanedimethanol, 3,9-bis(1,1-dimethyl-2-hydroxyethyl)-2,4,8,10-tetraoxaspiro[5.5]undecane, 2,2-bis(4-hydroxycyclohexyl)propane, tetrahydrofuran-2,5-dimethanol, and 1,4:3,6-dianhydrohexitols such as isomannide, isoidide and isosorbide.

3. The process according to embodiment 2, characterized in that the at least one aliphatic dihydroxy compound is isosorbide.

The process according to any of the preceding embodiments, characterized in that the at least one linear aliphatic dicarboxylic acid and/or the at least one cycloaliphatic dicarboxylic acid is represented by the general formula (1):

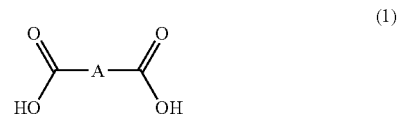

in which A represents $R_3$ or one of formulas (Ia) or (Ib),
   where $R_3$ represents a linear alkylene group having 3 to 16 carbon atoms, preferably 3 to 8 carbon atoms, more preferably 3 to 6 carbon atoms, further preferably 3 or 4 carbon atoms, and this alkylene group may optionally be mono- or polysubstituted or

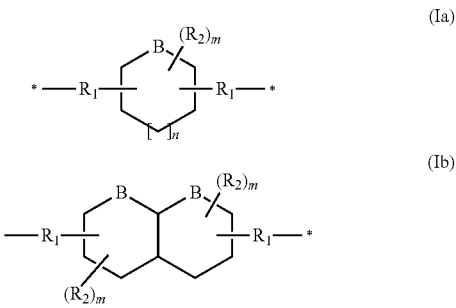

in which
   B in each case independently represents a $CH_2$ group, O or S,
   $R_1$ in each case independently represents a single bond or an alkylene group having 1 to 10 carbon atoms, preferably a single bond or an alkylene group having 1 to 9 carbon atoms, more preferably a single bond or an alkylene group having 1 to 8 carbon atoms, likewise preferably a single bond or an alkylene group having 1 to 5 carbon atoms, particularly preferably a single bond, and
   $R_2$ in each case independently represents an alkyl group having 1 to 10 carbon atoms, preferably 1 to 9 carbon atoms, more preferably 1 to 8 carbon atoms,
   n is a number between 0 and 3, preferably between 0 and 2, particularly preferably between 0 and 1, very particularly preferably 1,
   m is a number between 0 and 6, preferably between 0 and 3, particularly preferably between 0 and 2, very particularly preferably 0, and "*" indicate the positions at which the carboxylic acid groups in formula (1) are present, 4. The process according to embodiment 3, characterized in that $R_3$ is selected from —$CH_2$—$CH_2$—$CH_2$—, —$CH_2$—$CH_2$—$CH_2$—$CH_2$—, —$CH_2$—$CH_2$—$CH_2$—$CH_2$—$CH_2$—, —$CH_2$—$CH_2$—$CH_2$—$CH_2$—$CH_2$—$CH_2$—, —$CH_2$—$CH_2$—$CH_2$—$CH_2$—$CH_2$—$CH_2$—$CH_2$—, —$CH_2$—$CH_2$—$CH_2$—$CH_2$—$CH_2$—$CH_2$—$CH_2$—$CH_2$—, —$CH_2$—$CH_2$—$CH_2$—$CH_2$—$CH_2$—$CH_2$—$CH_2$—

CH$_2$—, —CH$_2$—C(CH$_3$)$_2$—CH$_2$—, —CH$_2$—CH(CH$_3$)—CH$_2$—C(CH$_3$)$_2$—, —CH$_2$—C(CH$_3$)$_2$—CH$_2$—CH(CH$_3$)—, and —CH(CH$_3$)—CH$_2$—CH$_2$—C(CH$_3$)$_2$—.

5. The process according to any of the preceding embodiments, characterized in that the at least one cycloaliphatic dicarboxylic acid is selected from a compound of the chemical formula (IIa), (IIb) or mixtures thereof.

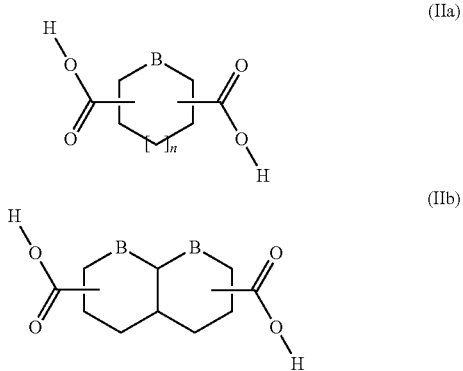

in which
B in each case independently represents a carbon atom or a heteroatom selected from the group consisting of O and S, preferably a CH$_2$ group or a heteroatom selected from the group consisting of O and S, and n is a number between 0 and 3.

6. The process according to any of the preceding embodiments, characterized in that the at least one cycloaliphatic dicarboxylic acid is selected from the group consisting of cyclohexane-1,4-dicarboxylic acid, cyclohexane-1,3-dicarboxylic acid, cyclohexane-1,2-dicarboxylic acid, tetradihydrofuran-2,5-dicarboxylic acid, tetradihydrodimethylfuran-2,5-dicarboxylic acid, decahydronaphthalene-2,4-dicarboxylic acid, decahydronaphthalene-2,5-dicarboxylic acid, decahydronaphthalene-2,6-dicarboxylic acid, decahydronaphthalene-2,7-dicarboxylic acid, and hydrogenated dimer fatty acid.

7. The process according to any of the preceding embodiments, characterized in that B in formulas (Ia) and (Ib) represents a CH$_2$ group.

8. The process according to any of the preceding embodiments, characterized in that the at least one cycloaliphatic dicarboxylic acid is selected from the group consisting of cyclohexane-1,4-dicarboxylic acid, cyclohexane-1,3-dicarboxylic acid, cyclohexane-1,2-dicarboxylic acid, and mixtures of these aliphatic dicarboxylic acids.

9. The process according to any of the preceding embodiments, characterized in that the at least one cycloaliphatic dicarboxylic acid is cyclohexane-1,4-dicarboxylic acid.

10. The process according to any of the preceding embodiments, characterized in that the at least one diaryl carbonate is selected from the group consisting of a compound of formula (2).

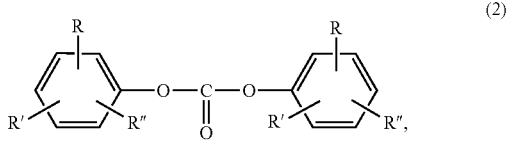

in which
R, R', and R" may each independently be identical or different and represent hydrogen, optionally branched C1-C34 alkyl, C7-C34 alkylaryl, C6-C34 aryl, a nitro group, a carbonyl-containing group, a carboxyl-containing group or a halogen group.

11. The process according to any of the preceding embodiments, characterized in that the at least one diaryl carbonate is diphenyl carbonate.

12. The process according to any of the preceding embodiments, characterized in that the first catalyst is selected from the group consisting of bases derived from guanidine, 4-dimethylaminopyridine, 1,8-diazabicyclo[5.4.0]undec-7-ene (DBU), 1,5-diazabicyclo[4.3.0]non-5-ene (DBN), 1,5,7-triazabicyclo[4.4.0]dec-5-ene and mixtures of these substances.

13. The process according to any of the preceding embodiments, characterized in that the first catalyst is 4-dimethylaminopyridine.

14. The process according to any of the preceding embodiments, characterized in that the first and the second catalyst are present in process step (i).

15. The process according to any of the preceding embodiments, characterized in that the first catalyst is used in an amount of from 0.002% to 0.1% by weight based on all components used in process step (i).

16. The process according to any of the preceding embodiments, characterized in that the molar ratio of all aliphatic dihydroxy compounds present in process step (i) to all linear aliphatic and/or cycloaliphatic dicarboxylic acids, preferably cycloaliphatic dicarboxylic acids, present in process step (i) prior to the reaction in process step (i) is 1:0.6 to 1:0.05.

17. The process according to any of the preceding embodiments, characterized in that the molar ratio of the sum of all aliphatic dihydroxy compounds present in process step (i) and all linear aliphatic and/or cycloaliphatic dicarboxylic acids, preferably cycloaliphatic dicarboxylic acids, present in process step (i) to all diaryl carbonates present in process step (i) prior to reaction in process step (i) is 1:0.4 to 1:1.6.

18. The process according to any of the preceding embodiments, characterized in that the alkali metal cations in process step (ii) are selected from lithium cations, potassium cations, sodium cations, cesium cations, and mixtures thereof.

19. The process according to embodiment 18, characterized in that the second catalyst is selected from the group consisting of sodium phenoxide, lithium phenoxide, sodium hydroxide, lithium hydroxide, sodium benzoate, lithium benzoate, and mixtures thereof, preferably selected from the group consisting of sodium phenoxide, sodium hydroxide, sodium benzoate, and mixtures thereof.

20. The process according to any of the preceding embodiments, characterized in that process step (ii) is carried out at temperatures within a range from 210° C. to 280° C.

21. The process according to any of the preceding embodiments, characterized in that all monomers that are to undergo condensation to the polyester carbonate in process step (ii) are already present during process step (i).

22. The process according to any of the preceding embodiments, characterized in that the chemical compound eliminated in the condensation is removed in process step (ii) by means of reduced pressure.

23. A polyester carbonate obtainable by the process according to any of embodiments 0 to 22.

24. A molding compound comprising a polyester carbonate according to embodiment 23.
25. A molding comprising a polyester carbonate according to embodiment 23.

EXAMPLES

Materials Used:
Cyclohexanedicarboxylic acid: Cyclohexane-1,4-dicarboxylic acid; CAS 1076-97-7 99%; Tokyo Chemical Industries, Japan, abbreviated to CHDA. The CHDA contained less than 1 ppm sodium by elemental analysis.

Diphenyl carbonate: Diphenyl carbonate, 99.5%, CAS 102-09-0; Acros Organics, Geel, Belgium, abbreviated to DPC 4-Dimethylaminopyridine: 4-Dimethylaminopyridine; >98.0%; purum; CAS 1122-58-3; Sigma-Aldrich, Munich, Germany, abbreviated to DMAP Isosorbide: Isosorbide (CAS: 652-67-5), 99.8%, Polysorb PS A; Roquette Freres (62136 Lestrem, France); abbreviated to ISB Sodium benzoate: Sodium benzoate (CAS 532-32-1); Sigma-Aldrich, Munich, Germany 3,3-Dimethylglutaric acid: (CAS 4839-46-7) ABCR GmbH, Karlsruhe, Germany Lithium hydroxide (LiOH): (CAS 1310-66-3); Sigma-Aldrich, Munich, Germany Analytical Methods:
Solution Viscosity Determination of solution viscosity: The relative solution viscosity (ηrel; also referred to as eta rel) was determined using an Ubbelohde viscometer in dichloromethane at a concentration of 5 g/l at 25° C. The determination was carried out in accordance with DIN 51562-3; 1985-05. In this determination, the transit times of the polyester carbonate under investigation are measured by the Ubbelohde viscometer in order to then determine the difference in viscosity between the polymer solution and its solvent. For this, the Ubbelohde viscometer undergoes an initial calibration through measurement of the pure solvents dichloromethane, trichloroethylene, and tetrachlorethylene (always performing at least 3 measurements, but not more than 9 measurements). This is followed by the calibration proper with the solvent dichloromethane. The polymer sample is then weighed out, dissolved in dichloromethane and the flow time for this solution then determined in triplicate. The average of the flow times is corrected via the Hagenbach correction and the relative solution viscosity calculated.

Example 1: 10 ppm Na

A flask with a short-path separator was charged with 17.20 g (0.10 mol) of cyclohexane-1,4-dicarboxylic acid, 29.83 g (0.204 mol) of isosorbide, 64.30 g (0.3 mol) of diphenyl carbonate, 0.0111 g of DMAP (4-dimethylaminopyridine; 100 ppm based on the starting materials CHDA, DPC, and ISB), and 50.2 µl of an aqueous solution of sodium benzoate (141.4 g/l), corresponding to approx. 10 ppm Na. The mixture was freed of oxygen by evacuating and releasing the vacuum with nitrogen four times. The mixture was melted and heated to 160° C. at standard pressure with stirring. The mixture was stirred at 160° C. for 50 minutes, at 175° C. for 50 minutes, at 190° C. for 30 minutes, and at 205° C. for 50 minutes. During this operation, carbon dioxide continuously evolves. On cessation of $CO_2$ evolution, the bath temperature is adjusted to 220° C. After a further 20 minutes, a negative pressure is applied. The pressure is lowered to 10 mbar over a 30-minute period. During this operation, phenol is continuously removed. The mixture is stirred at 10 mbar for about 10 minutes. The pressure is then lowered to <1 mbar (approx. 0.7 mbar) and condensation continued for a further 10 minutes. Processing of the mixture was then stopped.

A light brown polymer with a solution viscosity of eta rel 1.258 was obtained.

The other examples (Ex.) and comparative examples (Comp.) were produced as stated for example 1, varying only the amounts of sodium benzoate and DMAP used. The data are summarized in Table 1. Shown in each case are the proportions by weight in ppm of DMAP and of alkali metal, based on the weights of the components used.

In all cases, both catalysts were added in process step (i). The catalysts remain in the reaction mixture completely. The proportions of DMAP and alkali metal are based on all components used in process step (i).

TABLE 1

|  | DMAP [ppm] | Alkali metal [ppm] | eta rel |
|---|---|---|---|
| Comp. 1 | 100 | 1 | 1.018 |
| Comp. 2 | 100 | 5 | 1.103 |
| Ex. 1 | 100 | 10 | 1.258 |
| Ex. 2 | 100 | 8 | 1.21 |
| Ex. 3 | 100 | 20 | 1.293 |
| Comp. 3 | 100 | 50 | 1.41 |
| Comp. 4 | 0 | 10 | 1.019 |

Examples 1 to 4 show that the process of the invention provides the desired polyester carbonates in the desired viscosity window. If the content of alkali ions is too low, as shown in comparative examples 1 and 2, only an inadequate increase in molecular weight can be achieved. If the alkali content is too high, as shown in comparative example 3, this results in viscosities that can practically no longer be processed. If only one catalyst is used (comparative example 4), the resulting viscosity is again too low.

Negative pressures employed in accordance with the invention;

Example 4

A flask with a short-path separator was charged with 103.2 g (0.60 mol) of cyclohexane-1,4-dicarboxylic acid, 176.35 g (1.206 mol) of isosorbide, 385.8 g (1.80 mol) of diphenyl carbonate, 0.0666 g of DMAP (4-dimethylaminopyridine; 100 ppm based on the starting materials CHDA, DPC, and ISB), and 30 ppm of sodium, in the form of an aqueous solution of sodium benzoate (same concentration as in example 1). The mixture was freed of oxygen by evacuating and releasing the vacuum with nitrogen four times. The mixture was melted and heated to 180° C. at standard pressure with stirring. Once the starting materials have melted completely, the mixture is stirred for 20 minutes. This is followed by a reduction in pressure to 240 mbar over a 25-minute period. The pressure is reduced to 140 mbar over a 40-minute period. During this operation, phenol is continuously distilled off. The vacuum in the reaction mixture is released with nitrogen and the mixture is checked to see whether $CO_2$ evolution is still taking place. On cessation of $CO_2$ evolution, the condensation phase (phase 2) is initiated (if $CO_2$ evolution can still be observed at this point, wait until this ceases; a further 100 ppm of DMAP can at this point be added—this is necessary if this catalyst has been completely removed in the first stage, which may be evidenced by a sluggish polycondensation phase). The pressure is adjusted to 140 mbar and the bath temperature to 105° C. The pressure is lowered to 70 mbar over a 15-minute period. After this, the pressure is over a 50-minute period reduced to 1 mbar and the bath temperature raised to 240° C. At 1 mbar and 240° C., the mixture is stirred for a further 20 minutes. If the melt gets drawn up onto the stirrer, it is removed from the stirrer and returned to the melt. In order to do this, the vacuum in the mixture must be temporarily released. A light brown polycondensate having an eta rel of 1.32 is obtained.

Example 4 shows that the process of the invention allows the reaction time in phase 1 to be significantly reduced through application of a negative pressure. Despite the higher quantities used, it was possible to shorten phase 1 significantly.

Example 5: 3,3-Dimethylglutaric acid

A three-necked flask with a short-path separator was charged with 24.63 g (0.1685 mol) of isosorbide, 8.01 g (0.05 mol) of 3,3-dimethylglutaric acid, 46.36 g (0.2165 mol) of diphenyl carbonate, 100 ppm (0.079 g) of DMAP, and 30 ppm of Li (as an aqueous solution of LiOH by means of a stock solution (100.00 g/L->0.078 mL). The contents of the flask were freed of oxygen by evacuating and releasing the vacuum with nitrogen four times. The mixture was heated to 160° C. and melted. After melting, the mixture was stirred at 160° C. for 45 minutes. The temperature was then increased to 225° C. in stages over a 1.5-hour period. The pressure was lowered to 500 mbar over a 30-minute period. During this operation, phenol was continuously removed. The temperature was increased to 235° C. and the pressure slowly lowered to 0.1 mbar over a 2-hour period. After stirring at 235° C. and 0.1 mbar for 10 minutes, the reaction was stopped and the melt removed.

A light-colored polymer melt having a solution viscosity of 1.256 and a glass transition temperature of 121° C. was obtained.

Example 6: Mixture of 3,3-dimethylglutaric acid and cyclohexanedicarboxylic acid A three-necked flask with a short-path separator was charged with 29.83 g (0.2040 mol) of isosorbide, 8.01 g (0.05 mol) of 3,3-dimethylglutaric acid, 8.60 g (0.050 mol) of cyclohexanedicarboxylic acid, 64.30 g (0.30 mol) of diphenyl carbonate, 100 ppm (0.0111 g) of DMAP, and 10 ppm of Na as sodium benzoate (0.0069 g). The contents of the flask were freed of oxygen by evacuating and releasing the vacuum with nitrogen four times. The mixture was heated to 160° C. and melted. After melting, the mixture was stirred at 160° C. for 15 minutes. The temperature was increased to 175° C. and stirring continued at this temperature for 75 minutes. A further 100 ppm (0.0111 g) of DMAP was then added and the mixture stirred at 175° C. for a further 30 minutes. After the evolution of gas had ceased, the temperature was increased to 220° C. in stages over a 1.5-hour period. During this operation, phenol was continuously removed. The temperature was then increased to 230° C. and the pressure reduced to 1 mbar in stages over a 1-hour period. The mixture was stirred at 1 mbar for a further 10 minutes, after which the melt was removed.

A light-colored polymer melt having a solution viscosity of eta rel 1.24 was obtained.

Examples 5 and 6 show that linear aliphatic dicarboxylic acids and also mixtures of linear aliphatic dicarboxylic acids with cycloaliphatic dicarboxylic acids also afford a polyester carbonate having the desired and processable viscosities.

The invention claimed is:

1. A process for producing a polyester carbonate by melt transesterification, comprising the steps of:
    (i) reacting at least one linear aliphatic dicarboxylic acid and/or at least one cycloaliphatic dicarboxylic acid with at least one diaryl carbonate in the presence of at least one aliphatic dihydroxy compound and in the presence of a first catalyst and/or a second catalyst,
    (ii) subjecting the mixture obtained from process step (i) to a further condensation in the presence of the first catalyst and the second catalyst, at least with removal of the chemical compound eliminated in the condensation,
    wherein the first catalyst is at least one tertiary nitrogen base,
    wherein the second catalyst is at least one basic alkali metal salt,
    and wherein the proportion of alkali metal cations in process step (ii) is 0.0008% to 0.0030% by weight based on all components used in process step (i).

2. The process as claimed in claim 1, wherein the at least one aliphatic dihydroxy compound is selected from the group consisting of cyclohexane-1,2-diol, cyclohexane-1,3-diol, cyclohexane-1,4-diol, cyclohexane-1,2-dimethanol, cyclohexane-1,3-dimethanol, cyclohexane-1,4-dimethanol, tricyclodecanedimethanol, 3,9-bis (1,1-dimethyl-2-hydroxyethyl)-2,4,8,10-tetraoxaspiro [5.5]undecane, 2,2-bis (4-hydroxycyclohexyl) propane, tetrahydrofuran-2,5-dimethanol, and 1,4:3,6-dianhydrohexitols.

3. The process as claimed in claim 2, wherein the at least one aliphatic dihydroxy compound is isosorbide.

4. The process as claimed in claim 1, wherein the at least one linear aliphatic dicarboxylic acid and/or the at least one cycloaliphatic dicarboxylic acid is a hydrogenated dimer fatty acid or is represented by the general formula (1):

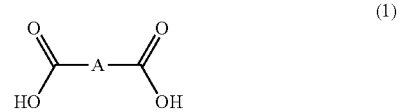

(1)

in which A represents $R_3$ or one of formulas (Ia) or (Ib), where $R_3$ represents a linear alkylene group having 3 to 16 carbon atoms, and this alkylene group may optionally be mono-or polysubstituted or

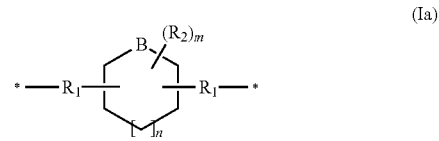

(Ia)

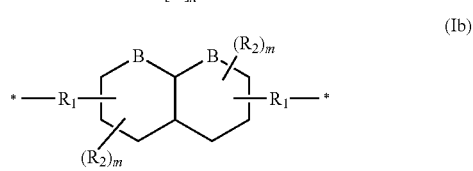

(Ib)

in which
B in each case independently represents a $CH_2$ group, O or S, $R_1$ in each case independently represents a single bond or an alkylene group having 1 to 10 carbon atoms, and $R_2$ in each case independently represents an alkyl group having 1 to 10 carbon atoms, n is a number between 0 and 3, m is a number between 0 and 6, and "*" indicate the positions at which the carboxylic acid groups in formula (1) are present.

5. The process as claimed in claim 4, wherein $R_3$ is selected from —$CH_2$—$CH_2$—$CH_2$—, —$CH_2$—$CH_2$—$CH_2$—$CH_2$—, —$CH_2$—$CH_2$—$CH_2$—$CH_2$—$CH_2$—, —$CH_2$—$CH_2$—$CH_2$—$CH_2$—$CH_2$—$CH_2$—, —$CH_2$—$CH_2$—$CH_2$—$CH_2$—$CH_2$—$CH_2$—$CH_2$—, —$CH_2$—$CH_2$—$CH_2$—$CH_2$—$CH_2$—$CH_2$—$CH_2$—$CH_2$—, —$CH_2$—C($CH_3$)$_2$—$CH_2$—, —$CH_2$—CH($CH_3$)—$CH_2$—C($CH_3$)$_2$—, —$CH_2$—C($CH_3$)$_2$—$CH_2$—CH($CH_3$)—, and —CH($CH_3$)—$CH_2$—$CH_2$—C($CH_3$)$_2$— and the cycloaliphatic dicarboxylic acid is hydrogenated dimer fatty acid or a compound of formula (IIa), (IIb) or mixtures thereof,

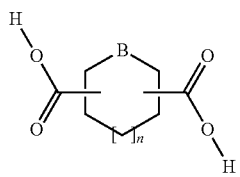

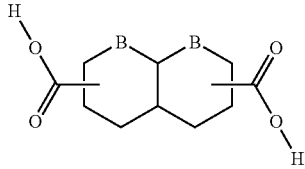

in which

B in each case independently represents a $CH_2$ group or a heteroatom selected from the group consisting of O and S, and n is a number between 0 and 3.

6. The process as claimed in claim 5, wherein the at least one cycloaliphatic dicarboxylic acid is cyclohexane-1,4-dicarboxylic acid.

7. The process as claimed in claim 1, wherein the at least one diaryl carbonate is selected from the group consisting of a compound of formula (2),

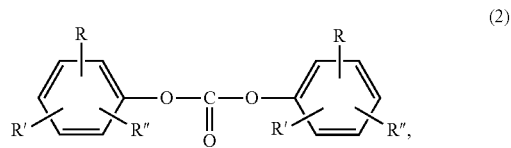

in which

R, R', and R" are each independently identical or different and represent hydrogen, optionally branched C1-C34 alkyl, C7-C34 alkylaryl, C6-C34 aryl, a nitro group, a carbonyl-containing group, a carboxyl-containing group or a halogen group.

8. The process as claimed in claim 7, wherein the at least one diaryl carbonate is diphenyl carbonate.

9. The process as claimed in claim 1, wherein the first catalyst is selected from the group consisting of bases derived from guanidine, 4-dimethylaminopyridine, 1,8-diazabicyclo [5.4.0]undec-7-ene (DBU), 1,5-diazabicyclo [4.3.0]non-5-ene (DBN), 1,5,7-triazabicyclo [5.4.0]dec-5-ene and mixtures of these substances.

10. The process as claimed in claim 1, wherein the first catalyst is used in an amount of from 0.002% to 0.1% by weight based on all components used in process step (i).

11. The process as claimed in claim 1, wherein the second catalyst is selected from the group consisting of sodium phenoxide, lithium phenoxide, sodium hydroxide, lithium hydroxide, sodium benzoate, lithium benzoate, and mixtures thereof.

12. The process as claimed in claim 1, wherein the chemical compound eliminated in the condensation is removed in process step (ii) by means of reduced pressure.

* * * * *